United States Patent

Lin

(10) Patent No.: US 10,345,956 B2
(45) Date of Patent: Jul. 9, 2019

(54) MULTICHANNEL TOUCH CONTROLLER HAVING A STANDBY CHANNEL SWITCHING CIRCUIT

(71) Applicant: eGalax_eMPIA Technology Inc., Taipei (TW)

(72) Inventor: Po-Chuan Lin, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 29 days.

(21) Appl. No.: 15/614,953

(22) Filed: Jun. 6, 2017

(65) Prior Publication Data

US 2018/0188879 A1 Jul. 5, 2018

(30) Foreign Application Priority Data

Dec. 30, 2016 (TW) .............................. 105144189 A

(51) Int. Cl.
*G06F 3/041* (2006.01)
*G06F 3/0488* (2013.01)
*G06F 3/044* (2006.01)

(52) U.S. Cl.
CPC ............ *G06F 3/0416* (2013.01); *G06F 3/044* (2013.01); *G06F 3/0418* (2013.01); *G06F 3/0488* (2013.01); *G06F 2203/04104* (2013.01)

(58) Field of Classification Search
None
See application file for complete search history.

(56) References Cited

U.S. PATENT DOCUMENTS

| 2008/0076581 A1* | 3/2008 | Mattice | .................... G06F 3/041 463/46 |
| 2015/0205408 A1* | 7/2015 | Tsai | ........................ G06F 3/044 345/174 |
| 2017/0336891 A1* | 11/2017 | Rosenberg | ............ G06F 3/0412 |

* cited by examiner

*Primary Examiner* — Nicholas J Lee
(74) *Attorney, Agent, or Firm* — Muncy, Geissler, Olds & Lowe, P.C.

(57) ABSTRACT

A multichannel touch controller includes a signal receiving circuit having N electrode pins electrically connected to touch screen for receiving respective sensing signals, switching circuit having N switch sets each consisting of first switch and second switch respectively connected in parallel to the N electrode pins, microcontroller, and processing unit having N analog front-end circuits and analog-to-digital converters with N analog front-end circuits respectively electrically connected to the first switches, the $2^{nd}$ analog front-end circuit and the N+1 analog front-end circuits respectively electrically connected to the second switches and the analog-to-digital converters respectively electrically connecting the analog front-end circuits to the microcontroller (MCU) to constitute N+1 channels for processing sensing signals so that when one channel fails, the microcontroller switches off the respective first switch and switches on the respective second switch so as to skip the failed channel until switching of the last electrode pin to the standby channel.

6 Claims, 8 Drawing Sheets

MULTICHANNEL TOUCH CONTROLLER HAVING A STANDBY CHANNEL SWITCHING CIRCUIT

This application claims the priority benefit of Taiwan patent application number 105144189, filed on Dec. 30, 2016.

BACKGROUND OF THE INVENTION

1. Field of the Invention

The present invention relates to touch control technology and more particularly, to a multichannel touch controller having a standby channel switching circuit, which is so configured that when one channel of the controller fails, the standby channel is enabled, the first switches and second switches of the switching circuit after the electrode pin corresponding to the defective channel will be switched sequentially to skip the defective channel until switching of the last electrode pin to the standby channel, and thus, the invention can achieve channel switching stability, enhance product yield and reduce the cost.

2. Description of the Related Art

A touch screen is a combination of a touch panel and a display screen and commonly used as an input interface for an electronic device to detect touch input in a display area. Commercial touch screens include two types, namely, the capacitive type and the resistive type. As the sizes of touch panels are made bigger and bigger, in order to achieve a good sensing effect, the density, the sensing point density must be maintained, and thus, the number of channels for the transmission of sensing signals needs to be relatively increased.

Normally, a touch panel comprises a sensing layer having multiple first direction electrodes and multiple second direction electrodes, a controller comprising a driving and sensing unit electrically coupled to the first direction electrodes and the second direction electrodes, and a processor for controlling the driving and sensing unit to detect the touch point. As illustrated in FIGS. 7 and 8, a touch sensor of a capacitive touch panel consists of a plurality of horizontally arranged first electrodes TX<0>~TX<n> and a plurality of vertically arranged second electrodes RX<0>~RX<n>. The first electrodes TX and the second electrodes RX are respectively electrically coupled to a controller through a respective independent channel. Every first electrode TX or second electrode RX needs a respective independent channel for processing. For example, after a sensing signal passed through every second electrode RX to the controller, an independent channel from the analog front-end (AFE, i.e., FE<0>~FE<n>) through the analog-to-digital converter (ADC) to the back-end processing circuit is needed for the processing of the signal. The intersecting points between the first electrodes TX and the second electrodes RX are defined as touch points. When the touch screen is electrically conducted, an electric field is created between the first and second electrodes at each touch point. When the user's finger touches the touch screen, a part of the electrical field around the respective touch point will be blocked, lowering the capacitance of the respective touch point, and thus, the location of the touch point can then be detected.

However, a semiconductor manufacturing process for the fabrication of a controller chip for touch screen includes the procedures of photoresist coating, exposure, developer and baking. A defect can occur in any procedure of the semiconductor manufacturing process. In the same wafer area under the same process, production line and production process, the probability of occurrence of a defect is the same. When increasing the number of first electrodes TX and second electrodes RX in a touch panel, the number of channels must be relatively increased, leading to an increase in the controller chip size. Under this condition, the number of chips a single wafer can be cut out will be relatively reduced, resulting in a lower yield. Further, a defect on a chip will only damage a small transistor in a channel circuit and cause the channel to be abnormal, however, for a controller chip, if one channel is damaged or fails, the entire controller is defective and cannot be used. Therefore, it is desirable to provide a measure that solves the problem of a defective product due to damage of one single channel in the controller chip.

SUMMARY OF THE INVENTION

The present invention has been accomplished under the circumstances in view. It is therefore the main object of the present invention to provide a touch controller, which is able to get the best signal-to-noise ratio, achieving optimal performance in touch control recognition.

To achieve this and other objects of the present invention, a multichannel touch controller comprises a signal receiving circuit, a switching circuit, a microcontroller, and a processing unit. The signal receiving circuit comprises N electrode pins electrically connected to a touch screen for receiving respective sensing signals generated by the touch screen, a switching circuit electrically connected to the signal receiving circuit and comprising N switch sets each consisting of a first switch and a second switch. The first switches and second switches of the N switch sets of the switching circuit are respectively connected in parallel to the N electrode pins of the signal receiving circuit. The processing unit comprises N+1 analog front-end circuits and analog-to-digital converters. The N analog front-end circuits are respectively electrically connected to the first switches of the switch sets of the switching circuit. The $2^{nd}$ analog front-end circuit and the N+1 analog front-end circuits are respectively electrically connected to the second switches of the switch sets of the switching circuit. The analog-to-digital converters respectively electrically connect the N+1 analog front-end circuits to the microcontroller (MCU) to constitute N+1 channels for processing sensing signals. When one channel fails, the microcontroller switches off the respective first switch and switches on the respective second switch so as to skip the failed channel until switching of the last electrode pin to the standby channel.

Preferably, the multichannel touch controller further comprises a test signal generating circuit. The test signal generating circuit comprises n+1 third switches, a plurality of common input contacts respectively electrically coupled to respective input ends of the third switches, and a plurality of output contacts respectively electrically connecting respective output ends of the third switch to the respective channels between the respective first switches of the switching circuit and the respective analog front-end circuits of the processing unit.

If the $m^{th}$ channel failed, the microcontroller will enable m−1~0 switching signals SWa to switch on the respective first switches and to switch off the respective second switches, and will also enable n~m switching signals SWa to switch on the respective second switches and to switch off the respective first switches sequentially so as to skip the defective m$^{th}$ channel until switching of the last electrode pin to the standby channel (n+1). Thus, the defective m$^{th}$ channel can be accurately tested out, and the switching can be performed sequentially to skip the defective m$^{th}$ channel until switching of the last electrode pin to the standby channel (n+1). Thus, the invention effectively solves the problem of an unusable bad product with a channel damage caused by a process defect, achieving channel switching stability, enhancing product yield and reducing the cost.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
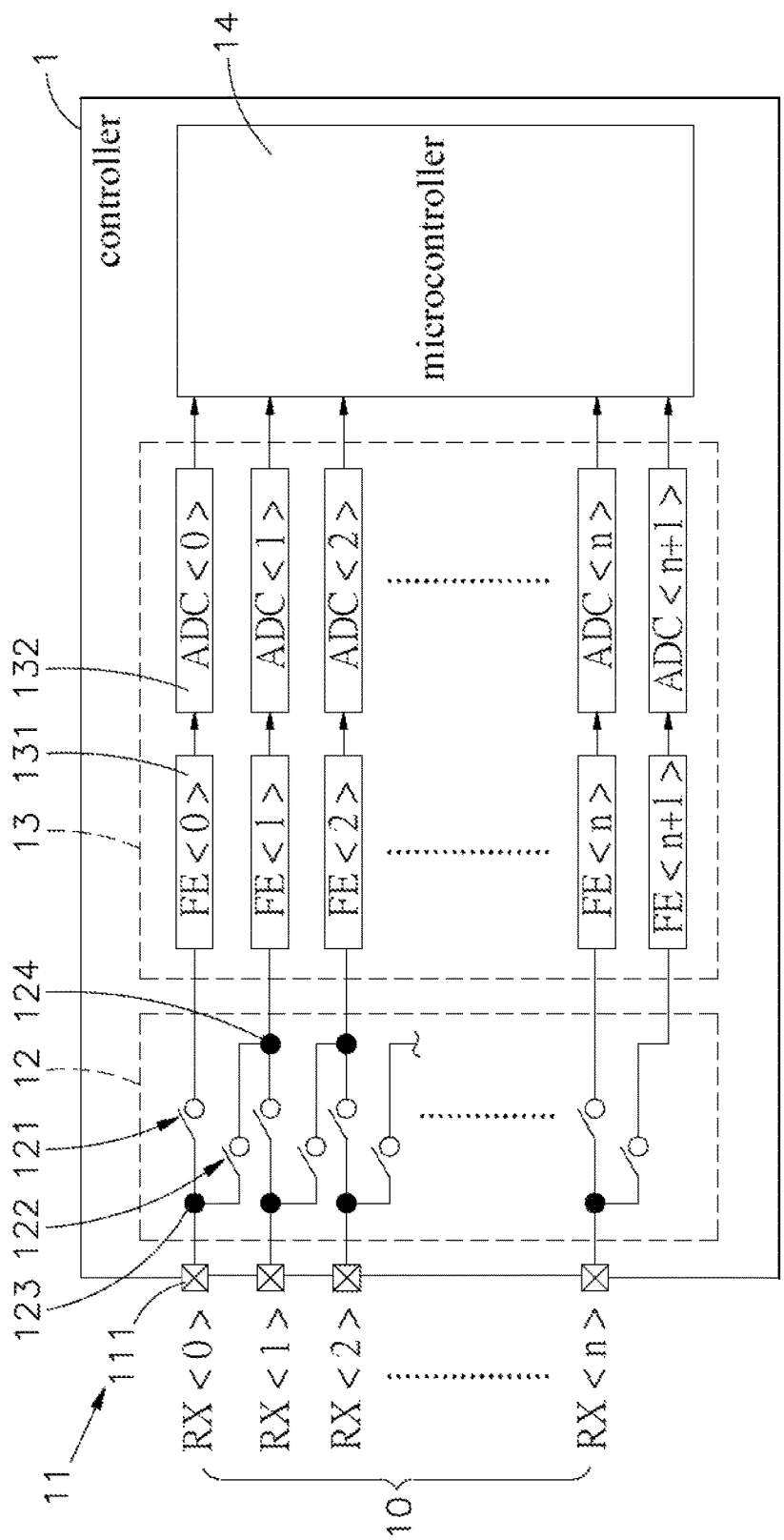
FIG. 1 is a circuit block diagram of a multichannel touch controller in accordance with the present invention.

Referring to FIGS. 1-4, a multichannel touch controller having a standby channel switching circuit in accordance with the present invention is shown. The multichannel touch controller comprises a controller 1 for use in a touch screen. The controller 1 comprises a signal receiving circuit 11, a switching circuit 12, a processing unit 13, and a microcontroller 14 (MCU).

The signal receiving circuit 11 of the controller 1 comprises N electrode pins 111 (RX<0>~RX<n>) electrically connected to the touch screen for receiving respective sensing signals generated by the touch screen. The switching circuit 12 is electrically connected to the signal receiving circuit 11, comprising N switch sets each consisting of a first switch 121 and a second switch 122. The input ends of the first switches 121 and the second switches 122 of the switch sets are respectively connected in parallel to the N electrode pins 111 through respective common input contacts 123. The processing unit 13 comprises N+1 analog front-end circuits 131 and N+1 analog-to-digital converters 132. The N analog front-end circuits 131 (FE<0>~FE<n>) are respectively electrically connected to the output ends of the first switches 121 of the multiple switch sets. The output ends of the second switches 122 of the multiple switch sets are respectively electrically connected to the 2$^{nd}$ analog front-end circuit 131 (FE<1>~FE<n>) and the N+1 analog front-end circuit 131 (FE<n+1>) through a respective output contact 124. The N+1 analog-to-digital converters 132 (ADC<0>~ADC<n+1>) respectively electrically connect the N+1 analog front-end circuits 131 to the microcontroller 14 (MCU) to constitute N+1 channels 10 for processing sensing signals.

The microcontroller 14 can determine the location of the touched point according to the first electrode TX been driven and by comparing the sensed signal generated by the second electrode RX when touched to the reference signal generated by the second electrode RX when not touched. Further, the microcontroller 14 can use switching signals SWa, SWb to control the closing or opening of the first switch 121 and the second switch 122 of each switch set.

Further, the first switches 121 and the second switches 122 of the switching circuit 12 in the present preferred embodiment are single-pole single-throw (SPST) toggle switches, however, in actual application, transistor switches or diode switches can be selectively used as substitutes. When the switching signal SWa transmitted by the microcontroller 14 is at the positive voltage level, the first switch 121 is closed, and the second switch 122 is opened when the switching signal SWb transmitted by the microcontroller 14 at this time is at the negative voltage level; when the switching signal SWa transmitted by the microcontroller 14 is at the negative voltage level, the first switch 121 is opened, and the second switch 122 is closed when the switching signal SWb transmitted by the microcontroller 14 at this time is at the positive voltage level; thus, the first switch 121 and the second switch 122 are respectively and alternatively switched on or off.

Figure 2:
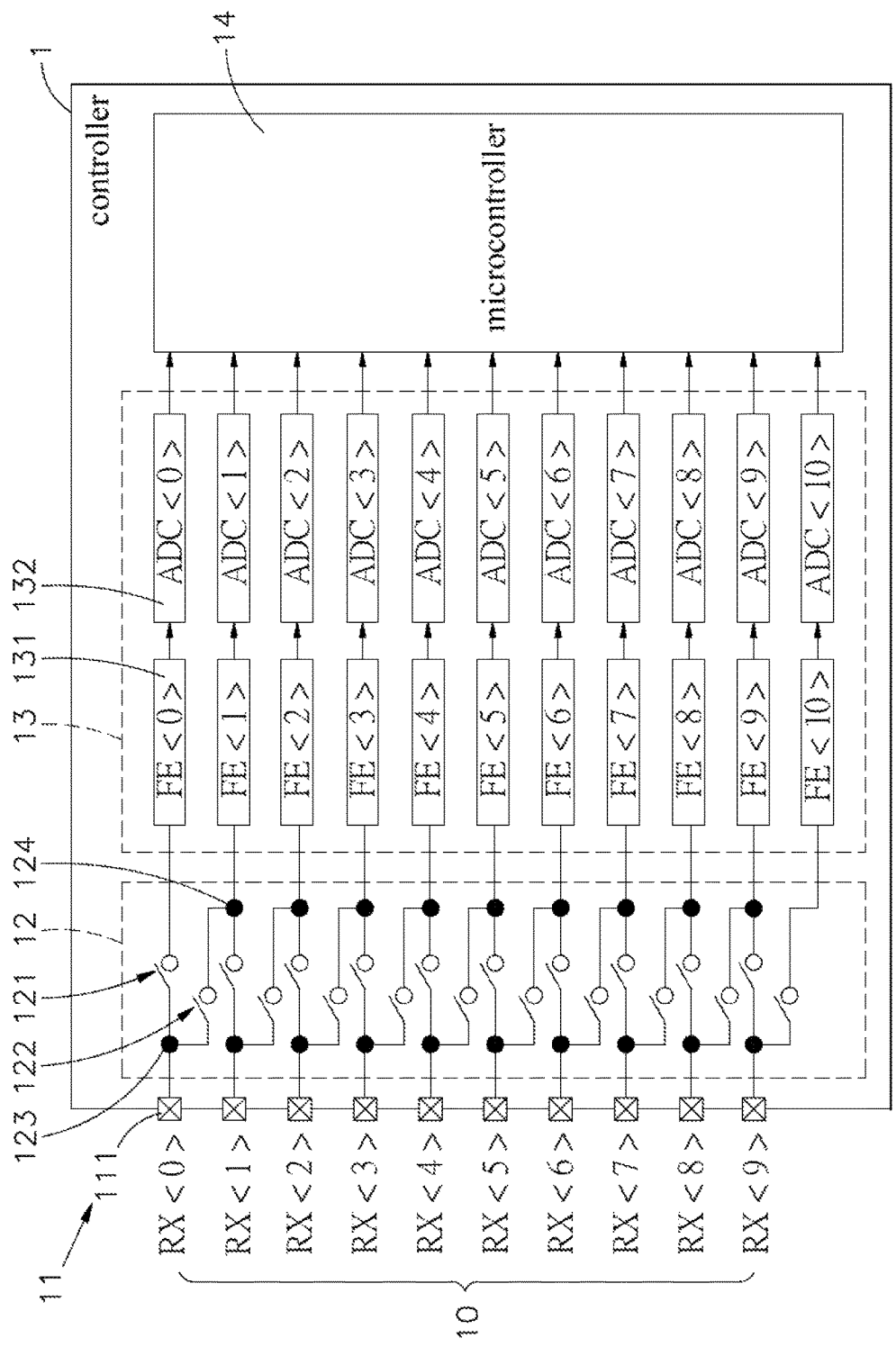
FIG. 2 is a circuit block diagram of the present invention, illustrating the positions of the first switches and second switches of the switching circuit prior to switching for sensing signal receiving.

In the present preferred embodiment, the signal receiving circuit 11 comprises 10 electrode pins 111 (RX<0>~RX<n=9>); in order for enabling the switching circuit 12 and the processing unit 13 to match the signal receiving circuit 11, an additional standby channel 10 (n=10) is provided, and thus, as illustrated in FIGS. 1 and 2, the total number of channels is increase to n+1=11 (in which n=0, 1, . . . , 9) channels 10.

Figure 3:
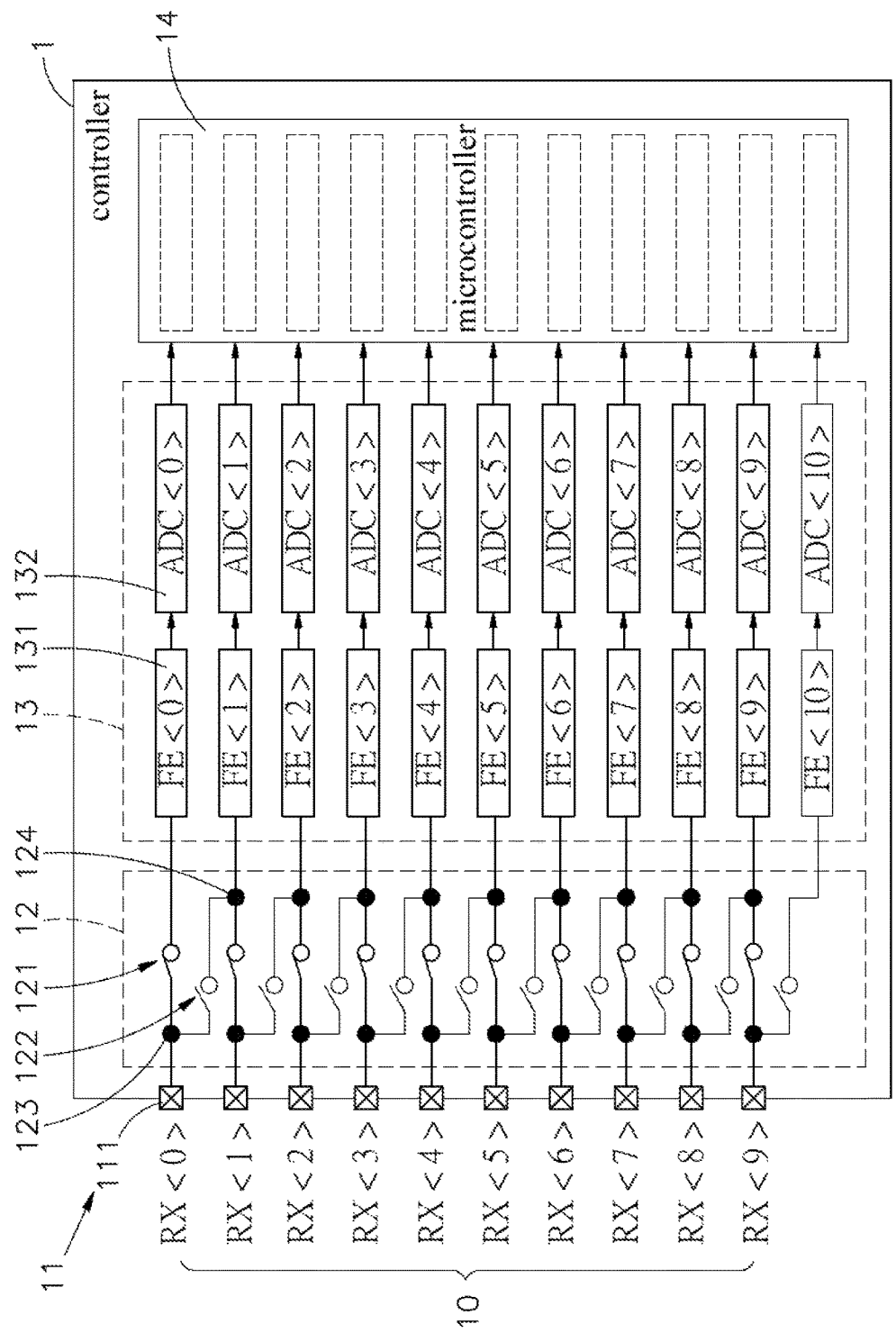
FIG. 3 corresponds to FIG. 2, illustrating the first switches and second switches of the switching circuit after switched for sensing signal receiving.

In actual operation, the sensing signal generated by the second electrode RX is transferred through the N electrode pins 111 (RX<0>~RX<9>) of the signal receiving circuit 11 to the controller 1, causing the switching circuit 12 to switch on the first switch 121 and to switch off the second switch 122 (see FIG. 3). Thus, the sensing signal is allowed to go through the analog front-end circuit 131 (FE<0>~FE<9>) and the analog-to-digital converter 132 (ADC<0>~ADC<9>) of the processing unit 13 to the microcontroller 14 for the determination of the location of the touched point. If there is no defect in the controller 1, the sensing signal will be processed through the original 10 channel 10 (n=0~9), and the standby channel 10 will not be enabled at this time.

Figure 4:
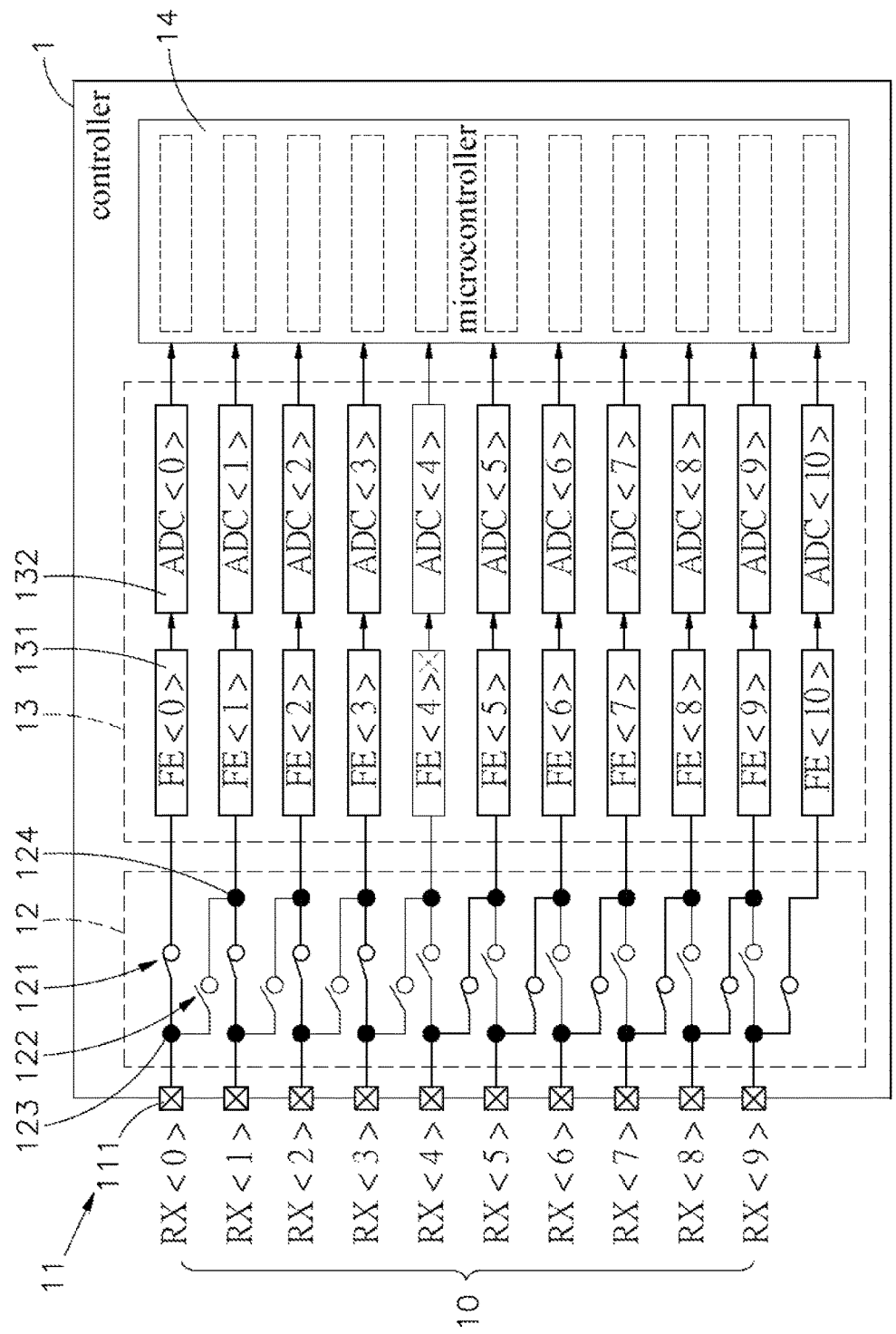
FIG. 4 is a circuit block diagram of the present invention, illustrating the last electrode pin switched to the standby channel.

If there is a defect in any component or circuit in the channel 10 (n=4) (for example, the 4$^{th}$ analog front-end circuit 131 (FE<4>), the first switch 121 of the 4$^{th}$ electrode pin 111 (RX<4>) will be switched off and the second switch 122 of the 4$^{th}$ electrode pin 111 (RX<4>) will be switched on, enabling the sensing signal to be processed through the next channel 10 (n=5), as illustrated in FIG. 4. At this time, the first switches 121 and the second switches 122 after the 4$^{th}$ electrode pin 111 (RX<4>) will be switched sequentially in the same manner as described above to skip the defective 4$^{th}$ channel 10 until switching of the last electrode pin 111 (RX<9>) to the standby 11$^{th}$ channel 10 (n=11).

Therefore, if there is a defect in the any channel 10 (n=0~9) of the controller 1, the standby channel 10 will be enabled, and the first switches 121 and the second switches 122 of the switching circuit 12 that are electrically coupled between the electrode pins 111 of the signal receiving circuit 11 and the analog front-end circuits 131 of the processing unit 13 after the electrode pin 111 (RX<n>) corresponding to the defective channel 10 will be switched sequentially to skip the defective channel 10 until switching of the last electrode pin 111 (RX<n>) to the standby channel 10.

According to the present inventor's experience in developing, manufacturing of touch control-related products, the most problematic controller 1 has the only one channel 10 damaged, so the controller 1 of the present invention can enable one standby channel 10 to effectively solve the problem of an unusable bad product with a channel damage caused by a process defect, achieving channel switching stability, enhancing product yield and reducing the cost.

Figure 5:
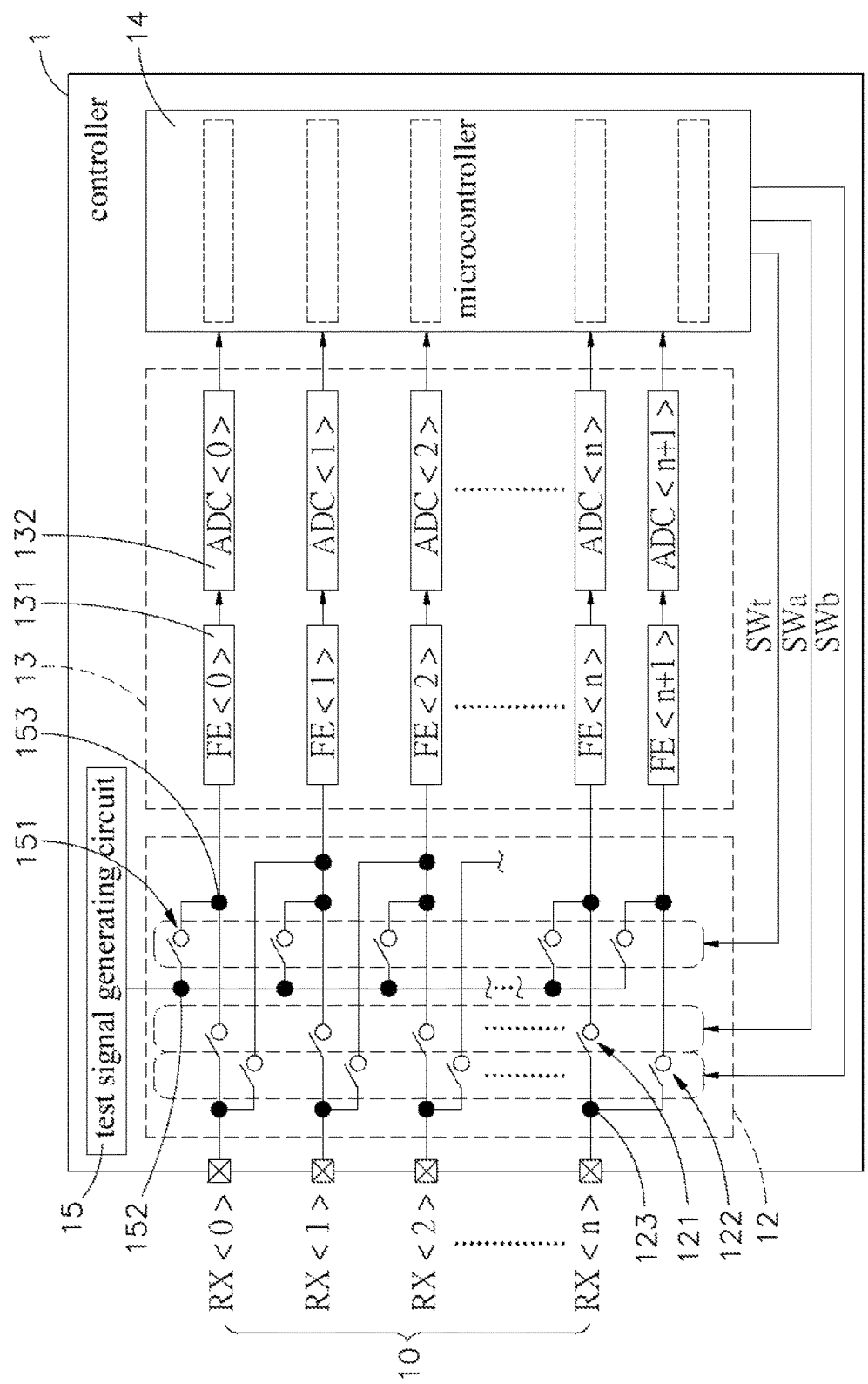
FIG. 5 is a circuit block diagram of the present invention, illustrating the positions of the third switches of the test signal generating circuit before test.
Figure 6:
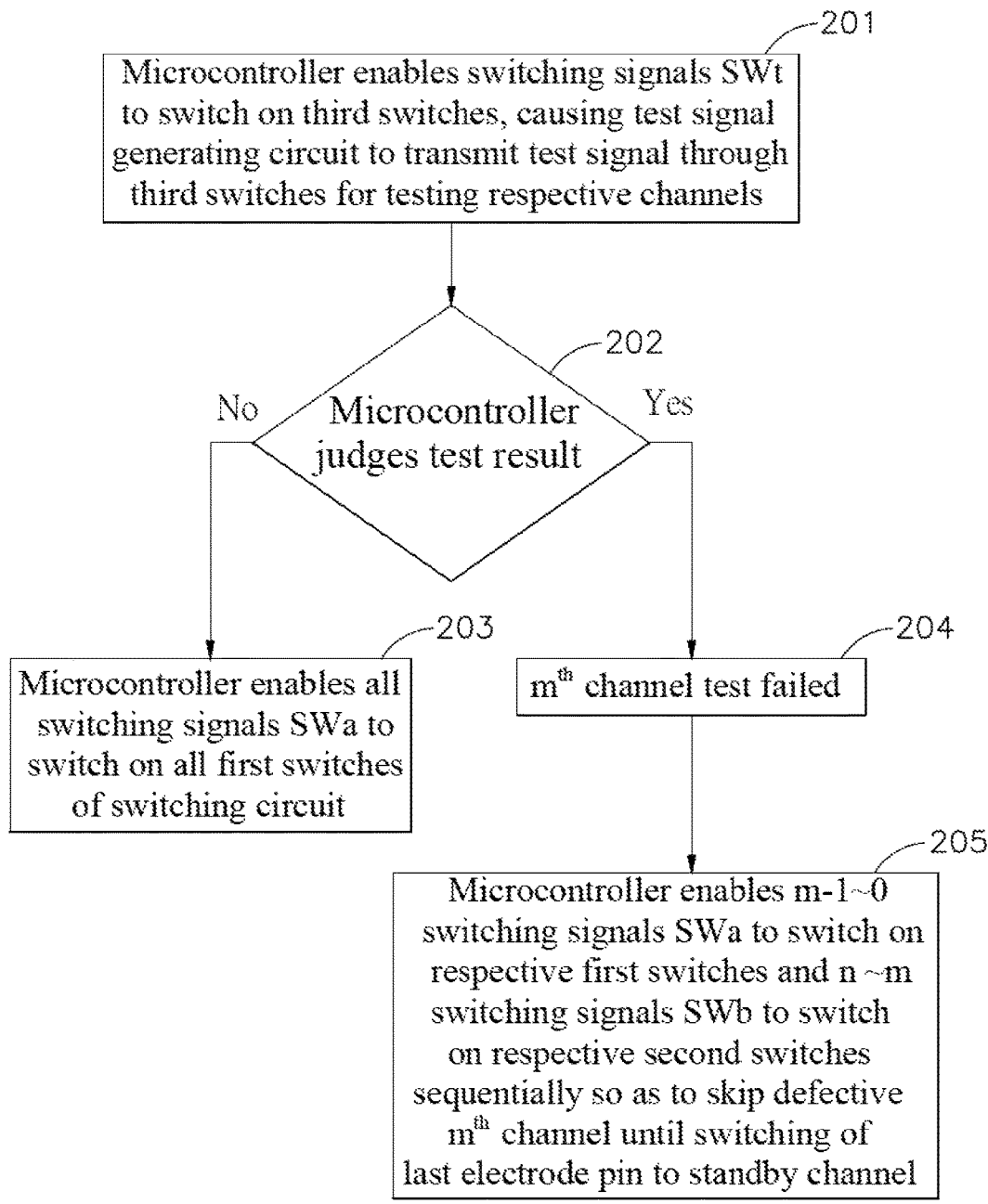
FIG. 6 corresponds to FIG. 5, illustrating the third switches of the test signal generating circuit switched for testing.
Figure 7:
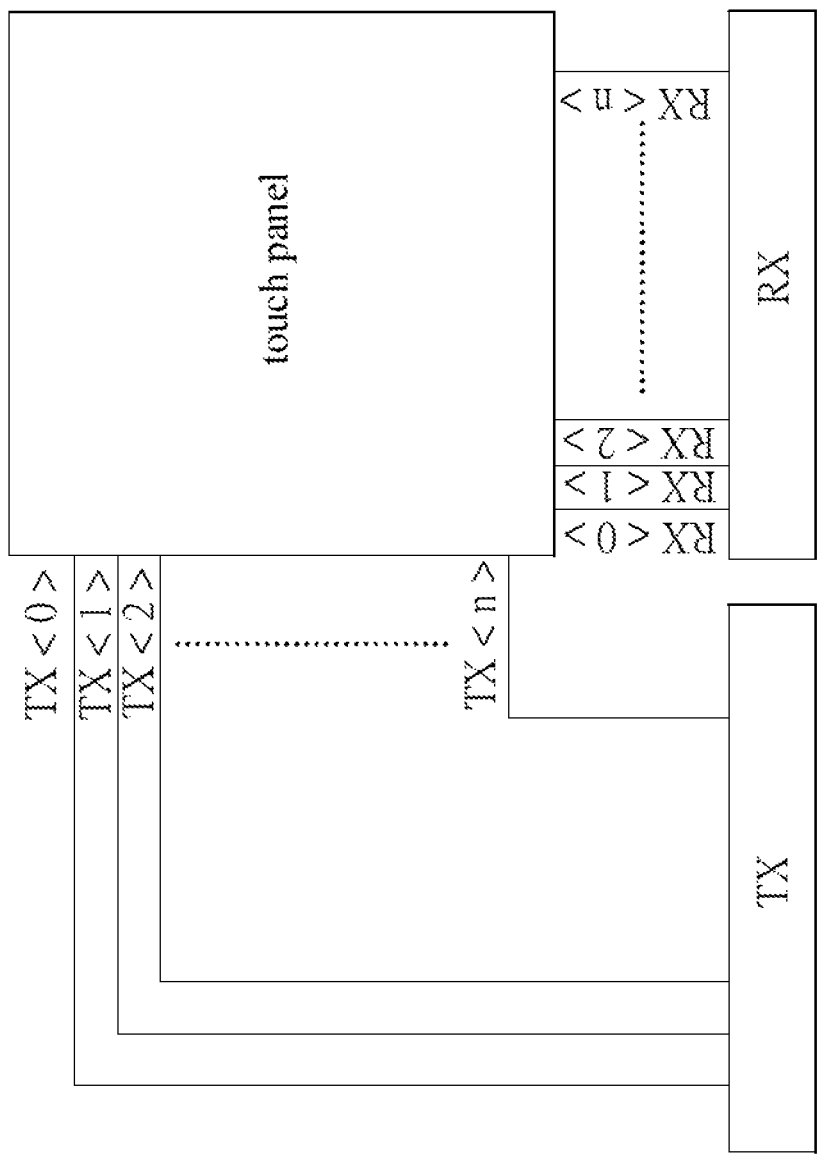
FIG. 7 is a block diagram of a touch control system according to the prior art.
Figure 8:
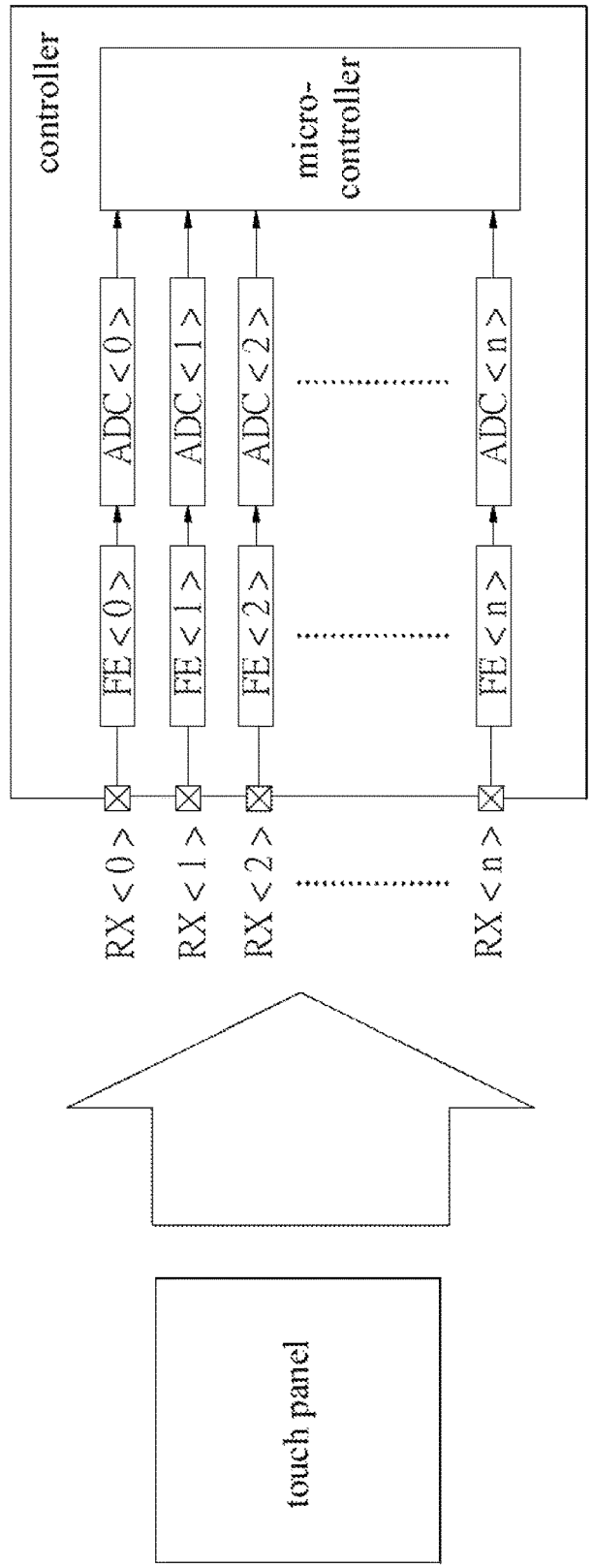
FIG. 8 is a block diagram of a touch screen and a controller according to the prior art.

Referring to FIGS. 5 and 6, the controller 1 further comprises a test signal generating circuit 15. The test signal generating circuit 15 comprises n+1 third switches 151, a plurality of common input contacts 152 respectively electrically coupled to respective input ends of the third switches 151, and a plurality of output contacts 153 respectively electrically connecting respective output ends of the third switch 151 to the respective channels 10 between the respective first switches 121 of the switching circuit 12 and the respective analog front-end circuits 131 of the processing unit 13. Through the test signal generating circuit 15 of the controller 1, the microcontroller 14 can test the functioning of the n+1 channels 10. Further, these third switches 151 can be single-pole single-throw (SPST) toggle switches, transistor switches or diode switches, and switchable between ON and OFF positions by a switching signal SWt provided by the microcontroller 14.

When the multichannel touch controller having a standby channel switching circuit tests the channels 10, it runs as follows:

(201) The microcontroller 14 enables switching signals SWt to switch on all the third switches 151 of the test signal generating circuit 15, causing the test signal generating circuit 15 to transmit a test signal through the third switches 151 to test the respective channels 10.

(202) The microcontroller 14 judges the test result, and then proceeds to step (203) if there is no any channels 10 failed, or step (204) if there is one particular channel 10 failed.

(203) The microcontroller 14 enables all switching signals SWa to switch on all the first switches 121 of the switching circuit 12.

(204) The $m^{th}$ channel 10 test failed, the microcontroller 14 proceeds to step (205).

(205) The microcontroller 14 enables m−1~0 switching signals SWa to switch on the respective first switches 121 and N~m switching signals SWb to switch on the respective second switches 122 sequentially so as to skip the defective $m^{th}$ channel 10 until switching of the last electrode pin 111 to the standby channel 10.

As will be apparent from the steps described above, when the controller 1 is in operation, the microcontroller 14 enables the switching signals SWt to switch on the third switches 151 of the test signal generating circuit 15 so that the test signal generating circuit 15 can transmit a test signal through the third switches 151 to the analog front-end circuits 131 and the analog-to-digital converters 132 of the processing unit 13 to test the functioning of the respective channels 10. At this time, the microcontroller 14 judges the test result. If there is no any channels 10 failed, the microcontroller 14 enables all switching signals SWa to switch on all the first switches 121 of the switching circuit 12 and to switch off all the second switches 122 of the switching circuit 12, allowing sensing signals to be transmitted through the N channels 10 for further processing.

However, in step (204), if the $m^{th}$ channel 10 test failed, the microcontroller 14 will enable m−1~0 switching signals SWa to switch on the respective first switches 121 and to switch off the respective switch off the respective second switches 122, and will also enable n~m switching signals SWa to switch on the respective second switches 122 and to switch off the respective first switches 121 sequentially so as to skip the defective $m^{th}$ channel 10 until switching of the last electrode pin 111 to the standby channel 10 (n+1), wherein m≤n (n≥m). Thus, the defective $m^{th}$ channel 10 can be accurately tested out, and the switching can be performed sequentially to skip the defective $m^{th}$ channel 10 until switching of the last electrode pin 111 to the standby channel 10 (n+1). Thus, the invention effectively solves the problem of an unusable bad product with the channel 10 damage caused by a process defect, achieving the channel 10 switching stability, enhancing product yield and reducing the cost.

As described above, when one channel 10 of the controller 1 fails, the standby channel 10 is enabled, the first switches 121 and the second switches 122 of the switching circuit 12 that are electrically coupled between the electrode pins 111 of the signal receiving circuit 11 and the analog front-end circuits 131 of the processing unit 13 after the electrode pin 111 (RX<n>) corresponding to the defective channel 10 will be switched sequentially to skip the defective channel 10 until switching of the last electrode pin 111 (RX<n>) to the standby channel 10. So, the present invention can effectively solve the problem of an unusable bad product with a channel damage caused by a process defect, achieving channel switching stability, enhancing product yield and reducing the cost.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A multichannel touch controller used in a touch screen, comprising:
    a signal receiving circuit of a controller comprising N electrode pins, N being an integer greater than 1, electrically connected to a touch screen for receiving respective sensing signals generated by said touch screen;
    a switching circuit electrically connected to said N electrode pins, comprising N switch sets each consisting of a first switch and a second switch, said first switches and said second switches of said N switch sets of said switching circuit being respectively connected in parallel to said N electrode pins of said signal receiving circuit;
    a microcontroller; and
    a processing unit comprising N+1 analog front-end circuits and N+1 analog-to-digital converters, first to N analog front-end circuits being respectively electrically connected to said first switches of said N switch sets of said switching circuit, second to N+1 analog front-end circuits being respectively electrically connected to said second switches of said N switch sets of said switching circuit, said N+1 analog-to-digital converters respectively electrically connecting said N+1 analog front-end circuits to said microcontroller to constitute N+1 channels for processing sensing signals, wherein when one of said N+1 channels is damaged, said microcontroller switches off the respective said first switch and switches on the respective said second switch so as to skip said one of said N+1 channels until switching of the last one of said N electrode pin to said channel in standby.

2. The multichannel touch controller as claimed in claim 1, wherein said first switches and said second switches of said N switch sets of said switching circuit have respective input ends thereof respectively connected in parallel to said N electrode pins through respective common input contacts; said N analog front-end circuits of said processing unit are respectively electrically connected to respective output ends of said first switches of said N switch sets of said switching circuit; said second switches of said N switch sets of said switching circuit are respectively electrically connected to said second analog front-end circuit to said N+1 analog front-end circuit of said processing unit through a respective output contact.

3. The multichannel touch controller as claimed in claim 1, wherein said first switches and said second switches of said N switch sets of said switching circuit are selected from the group of single-pole single-throw (SPST) toggle switches, transistor switches and diode switches, and respectively switchable between an ON position and an OFF position by a switching signal provided by said microcontroller.

4. The multichannel touch controller as claimed in claim 1, further comprising a test signal generating circuit mounted in said controller, said test signal generating circuit comprising N+1 third switches, a plurality of common input contacts respectively electrically coupled to respective input ends of said third switches, and a plurality of output contacts respectively electrically connecting respective output ends of said third switch to the respective said channels between the respective said first switches of said switching circuit and the respective said analog front-end circuits of said processing unit.

5. The multichannel touch controller as claimed in claim 4, wherein said microcontroller is capable of controlling said test signal generating circuit to test the functioning of said channels subject to the steps of:

(a1) said microcontroller enabling switching signals SWt to switch on the respective said third switches of said test signal generating circuit, enabling said test signal generating circuit to transmit a test signal through each said third switch to test each said channel;

(a2) said microcontroller judging each said channel to be normal or abnormal according to a test result, and then proceeding to step (a3) if all said channels are normal, or step (a4) if one said channel failed;

(a3) said microcontroller enabling all switching signals SWa to switch on all said first switches of said switching circuit;

(a4) when an $m^{th}$ channel, m being an integer greater than 1 and less than or equal to N, fails, said microcontroller proceeding to step (a5); and (a5) said microcontroller enabling first to m−1 switching signal SWa to switch on the respective said first switches and m to N switching signals SWb to switch on the respective second switches sequentially so as to skip the defective said $m^{th}$ channel until switching of the last said electrode pin to said standby channel.

6. The multichannel touch controller as claimed in claim 4, wherein said first switches and said second switches of said switching circuit and said third switches of said test signal generating circuit are selected from the group of single-pole single-throw (SPST) toggle switches, transistor switches and diode switches, and respectively switchable between an ON position and an OFF position by a switching signal provided by said microcontroller.

* * * * *